United States Patent [19]

Whittingham et al.

[11] 4,086,403

[45] Apr. 25, 1978

[54] ALKALI METAL/NIOBIUM TRISELENIDE CELL HAVING A DIOXOLANE-BASED ELECTROLYTE

[75] Inventors: M. Stanley Whittingham, Fanwood; Gerald H. Newman, Westfield, both of N.J.

[73] Assignee: Exxon Research & Engineering Co., Linden, N.J.

[21] Appl. No.: 744,973

[22] Filed: Nov. 26, 1976

[51] Int. Cl.$^2$ .............................................. H01M 6/14
[52] U.S. Cl. ..................................... 429/194; 429/199
[58] Field of Search ............................... 429/194–197, 429/218, 199

[56] References Cited

U.S. PATENT DOCUMENTS

| 3,796,605 | 3/1974 | Dechenaux et al. | 429/197 |
| 3,864,167 | 2/1975 | Broadhead et al. | 429/194 |
| 3,947,289 | 3/1976 | Dey et al. | 429/194 |
| 4,002,492 | 1/1977 | Rao | 429/194 |

Primary Examiner—Charles F. LeFevour
Attorney, Agent, or Firm—Kenneth P. Glynn

[57] ABSTRACT

An improved rechargeable, high energy density electrochemical cell comprising an anode having as its active material an alkali metal, a cathode having as its active material a transition metal trichalcogenide and a nonaqueous electrolyte containing at least one ionizable salt of the anode-active material dissolved in a dioxolane solvent. A specific example is an electrochemical cell with an anode-active material of lithium or alloys thereof, a cathode of niobium triselenide and an electrolyte of lithium perchlorate dissolved in dioxolane.

12 Claims, No Drawings

ALKALI METAL/NIOBIUM TRISELENIDE CELL HAVING A DIOXOLANE-BASED ELECTROLYTE

BACKGROUND OF THE INVENTION

The present invention relates to high energy density electrochemical cells and more particularly to nonaqueous electrolytes for rechargeable, high energy density electrochemical cells having anode-cathode couples of alkali metals and transition metal trichalcogenides.

A recently developed rechargeable, high energy density electrochemical cell consisting of an electronegative material as the anode-active material, a transition metal trichalcogenide as the cathode-active material, and a nonaqueous electrolyte is described in U.S. Pat. No. 3,864,167. For example, a typical cell consists of a lithium anode, a titanium trisulfide cathode and a nonaqueous electrolyte consisting of lithium salts dissolved in organic solvents such as propylene carbonate. This type of cell has very recently been improved by the inclusion of dopants such as ethers in the electrolyte to enhance cell life, as described in U.S. Pat. No. 3,928,067.

An important feature of these cells is their ability to be discharged and charged. Theoretically, cycling by discharging and charging should be possible indefinitely, but in practice indefinite cycling is not realized. Dendritic growth on the anode during charging and degradation of the cathode material are usually the limiting factors in the amount of cycling a cell can be subjected to; but the electrolyte, particularly a nonaqueous electrolyte, can at times be the limiting factor. The effects of a particular solvent on the electrochemical performance of a cell cannot be determined on theoretical grounds, but must be ascertained empirically. A particular organic electrolyte might be highly effective with a given anode-cathode couple but be ineffective for another couple, either because it is not inert to the second couple or because it reacts with itself under the conditions present during cycling. Furthermore, an organic electrolyte might be perfectly suited for use in a primary cell and not usable for secondary cells.

Industrial use of any high energy density cell is dependent upon a number of factors including initial cost and service life. Wide industrial use of any electrochemical cell is dependent upon extending the service life of all components of the cell, including the electrolyte. Thus, improved electrochemical cell systems containing various organic electrolytes have been developed, as taught, for example, in U.S. Pat. No. 3,947,289. However, it is believed that the electrochemical cells of the present invention containing alkali metal anodes, trichalcogenide cathode-active materials, and the described electrolytes have not been heretofore disclosed.

BRIEF SUMMARY OF THE INVENTION

Generally speaking, the present invention contemplates an improved reversible electrochemical cell that includes an anode of an alkali metal or alloys thereof, a cathode of a transition metal trichalcogenide and an electrolyte containing at least one ionic salt of the alkali metal contained in the anode dissolved in a dioxolane solvent, ie., dioxolane or substituted dioxolane or solutions thereof.

DETAILED DESCRIPTION

The present invention is directed to a novel electric current-producing cell containing an anode having as its active material an alkali metal, a cathode having as its active material a transition metal trichalcogenide, and an electrolyte having one or more alkali metal salts dissolved in a dioxolane solvent.

In the anode of the cell of the present invention, the anode-active material is an alkali metal or an alloy thereof. Desirably, the anode is substantially sodium, potassium, lithium or alloys containing these, and preferably the anode is lithium metal or an alloy of lithium. The anode, e.g., lithium, may be in contact with other metal structures, e.g., nickel, copper or silver screens, which serve as current collectors and are well-known in the art.

The cathode employed in the cell of the present invention is one which contains as its cathode-active material one or more trichalcogenide compounds of the formula:

$$MZ_n \qquad (1)$$

wherein M is one or more metals selected from the group consisting of titanium, zirconium, hafnium, niobium and tantalum; Z is one or more chalcogens selected from the group consisting of sulfur and selenium; and $n$ is a numerical value between about 2.5 and about 3.5. Desirably M is niobium. Additionally, the numerical value $n$ is desirably between about 2.8 and about 3.2, preferably between about 2.9 and about 3.1.

The trichalcogenides used as the cathode-active material in the cell of the present invention are any of the materials contemplated by Formula (1), above. Among these are $TiS_3$; $ZrS_3$; $NbS_3$; $TiSe_3$; $NbSe_3$; $TaSe_3$; $TaS_3$ and the like. In fact, any trichalcogenide of the above-mentioned transitions metals may be used which exhibit the acceptable cathodic activity.

The cathode structure itself need not necessarily consist of the cathode-active material alone but may be a structure such as carbon, nickel, zinc, etc., upon which the trichalogenide is deposited. Preferably, the cathode structure consists entirely of the trichalcogenide. The cathode-active material is typically a good electronic conductor and may thus often serve as its own current collector. The cathode-active material may be admixed or diluted with a minor amount of any other electrochemically active material, and alloys (i.e., solid solutions) of the individual trichalcogenides may be used as well as the individual trichalcogenides. The cathode may be readily fabricated from the individual or alloyed trichalcogenides using materials and methods well known in the prior art, e.g., polytetrafluoroethylene bonding agents or support structures such as nickel or copper mesh.

The improved cell in accordance with the present invention employs as an electrolyte an ionizable salt of an alkali metal, e.g., the anode-active material, dissolved in a dioxolane solvent. By "dioxolane solvent" is meant dioxolane or a substituted dixolane compound or solutions thereof. Substituted dioxolanes include any dioxolane compound containing substituents which are not detrimental to the electrolyte solution from an operability standpoint. For example, included among these are alkyl substituted dioxolanes, e.g., methyl substituted dioxolanes, and alkyl ether substituted dioxolanes, e.g., methoxy substituted dioxolanes. However, dioxolane itself is preferred due to its availability and cost. The salt of the alkali metal should not react with or promote a reaction of the dioxolane compound solution. When lithium is employed as the anode-active material, ionic lithium salts, such as lithium perchlorate, lithium iodide, lithium bromide and the like, are particularly useful and can be dissolved in dioxolane solutions to provide electrolytes for the electrochemical cell. Lithium perchlorate has been found to be very effective when used in conjunction with dioxolane or solutions of dioxolane.

The concentration of the alkali metal salts, e.g., lithium salts, in the nonaqueous dioxolane solvent can vary from at least about 0.5 mole per liter (M/1) of solvent up to the saturation point. However, concentrations between about 0.1 M/1 and 3 M/1 have been found the most effective. At concentrations of less than about 0.5 M/1, the flow current through the cell may be significantly lowered due to the decrease in ionic mass transport. At concentrations higher than about 3 M/1, the risk of precipitating the alkali metal salts on the components of the electrochemical cell is substantially increased due to increased electrolyte viscosity and decreased mass transport.

The use of dioxolane compounds or solutions thereof as solvents for the alkali metal salts and particularly the lithium salts is an important feature of the present invention. Dioxolane compounds dissolve substantial quantities of the alkali metal salts, are substantially inert to both the anode and cathode materials, and are chemically stable under operating conditions. Moreover, they enhance the secondary characteristics of the battery.

Preferably, the electrolyte consists essentially of ionizable salts of the alkali metals, e.g., the anodeactive material, and dioxolane, but other additives and diluents can be employed in amounts up to about 50 percent as long as the novel characteristics of the electrolyte are not impaired. Straight chain ethers, cyclical ethers and polyethers are effective diluents. Specific examples of such diluents include dimethyoxyethane and tetrahydrofuran. Esters such as propylene carbonate should preferably not be present as they can be incorporated into the cathode structure causing substantial expansion and poorer rechargeability characteristics.

The present invention is illustrated by the following examples, but the invention should not be construed as being limited thereto;

EXAMPLE 1

A cell was prepared representing the present invention which was made up of a lithium anode surrounding a cathode of $NbSe_3$ which was bound together by 10% by weight of teflon and placed in a chemically inert holder, into which 2.5 molar (M) lithium perchlorate in dioxolane was added in an amount sufficient to completely immerse the anode and the cathode. A separator made of polypropylene was placed between the anode and the cathode, and the cell was designated as Cell A.

The cell was discharged and recharged through sixty cycles and the capacity of the cell was measured as a fraction of the first cycle capacity. Additionally, the number of lithium electrons per $NbSe_3$ was also determined for each cycle. The results are tabulated in Table I below.

To compare Cell A with that of the prior art, the data described in FIG. 2 of U.S. Pat. No. 3,928,067, which contained a lithium anode, a niobium triselenide cathode and an electrolyte made up of propylene carbonate as solvent with 0.9 molar lithium perchlorate, 0.1 molar tetrabutyl ammonium chloride and 3.0 weight percent tetraglyme, are also shown in Table 1, below for comparison.

The results shown in Table 1 confirm the superiority of the cell using the electrolyte of the present invention over that of prior art electrolytes. They show that the capacity of a cell may be enhanced by as much as 100% over a period of recycling by the use of a dioxolane based electrolyte system.

TABLE I
CYCLE LIFE BEHAVIOR OR LITHIUM ANODE/$NbSe_3$ CATHODE CELLS

| Number of Cycles | Cell A (Present Invention) | | Cell B (Prior Art) |
|---|---|---|---|
| | No. of Electrons Per $NbSe_3$ | Capacity As Fraction of 1st Life Cycle | Capacity As Fraction of 1st Life Cycle |
| 1 | 2.4 | 1 | 1 |
| 3 | 2.2 | 0.90 | 0.40 |
| 6 | 1.9 | 0.78 | 0.31 |
| 12 | 1.8 | 0.73 | 0.28 |
| 24 | 1.4 | 0.59 | 0.26 |
| 44 | 1.2 | 0.48 | 0.26 |
| 60 | 0.9 | 0.37 | 0.30 |

What is claimed is:

1. An electric current-producing cell, comprising:
   (a) an alkali metal-containing anode;
   (b) a cathode having as its cathode-active material, one or more trichalcogenides of the formula:

$MZ_n$ wherein M is niobium, wherein Z is selenium, and wherein $n$ is a numerical value between about 2.5 and 3.5; and
   (c) a non-aqueous electrolyte comprising at least one ionic alkali metal salt dissolved in a dioxolane solvent.

2. The cell of claim 1 wherein the anode is substantially sodium, lithium, potassium or alloys containing these.

3. The cell of claim 2 wherein said dioxolane solvent is dioxolane or a solution thereof.

4. The cell of claim 3 wherein the alkali metal salt in the electrolyte is a salt of the alkali metal contained in the anode.

5. The cell of claim 4 wherein the anode is substantially sodium, lithium, potassium or alloys containing these, and $n$ is a numerical value between about 2.8 and about 3.2.

6. The cell of claim 4 wherein the anode is substantially lithium or a lithium alloy.

7. The cell of claim 6 wherein the lithium salt in the dioxolane solvent has a concentration between about 0.5 and about 3 M/1.

8. The cell of claim 7 wherein the lithium salt is lithium perchlorate.

9. The cell of claim 8 wherein the cathode-active material is $NbSe_3$.

10. The cell of claim 4 wherein the electrolyte dioxolane solvent contains at least one diluent selected from the group consisting of straight chain ethers, polyethers, and cyclic ethers.

11. The cell of claim 10 wherein the electrolyte comprises an ionic lithium salt in a mixture of dioxolane and dimethyoxyethane.

12. The cell of claim 1 wherein the electrolyte dioxolane solvent contains at least one diluent selected from the group consisting of straight chain ethers, polyethers, and cyclic ethers.

* * * * *